Figure 1:
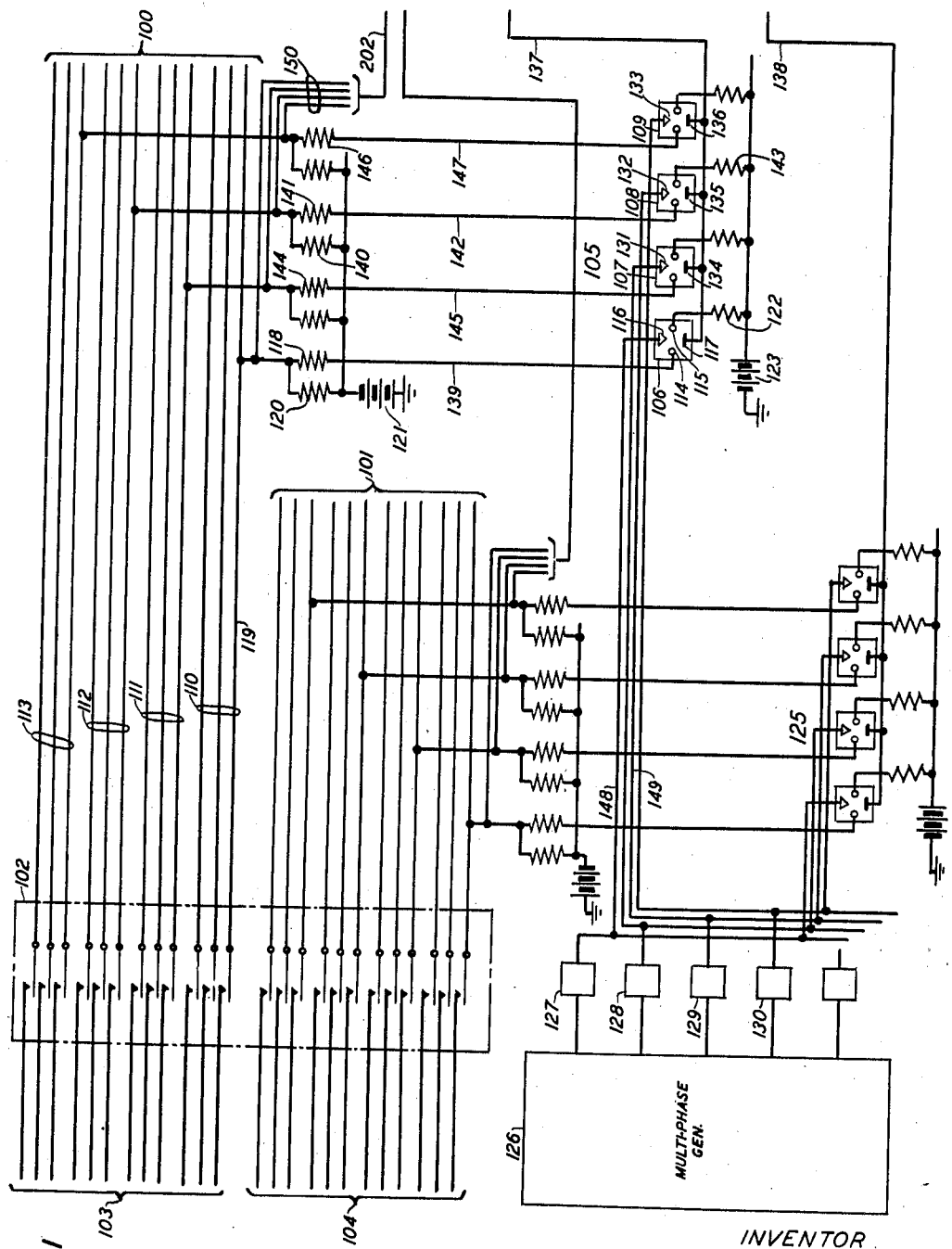

Patented Jan. 4, 1944

2,338,642

UNITED STATES PATENT OFFICE 2,338,642

TESTING AND SIGNALING SYSTEM

William H. T. Holden, Woodside, N. Y., assignor to Bell Telephone Laboratories, Incorporated, New York, N. Y., a corporation of New York Application February 8, 1941, Serial No. 377,989

10 Claims. (Cl. 179—18)

This invention relates to testing and signaling systems and particularly to systems for testing lines, trunks, or other electrical circuits.

The objects of the invention are to reduce the number of conductors required for testing the lines or trunks of a group; to simplify the connecting devices for connecting the testing equipment to the line or trunk group; and to obtain other improvements in testing systems.

In accordance with this invention these objects are obtained by means of a testing and signaling system in which the signals for determining the condition of the trunks of a group are transmitted over a single conductor to the testing equipment where they serve to operate test relays or similar devices to furnish an indication of the trunks that are idle or busy at the time the test is made. More specifically, the system is one in which a single test conductor extends from the trunk group to a testing mechanism, in which means is provided for generating impulses of different phases representing respectively the different trunks of the group, in which the impulses of those phases which correspond to idle trunks are transmitted over the conductor to the testing mechanism, and in which the testing mechanism is provided with means for receiving these impulses and for causing the operation of test relays to indicate the trunks of the group that are idle at the time the test is made.

A feature of the invention is a testing system in which the testing mechanism including the test relays is common to a plurality of groups of trunks, each trunk group being provided with a single impulse transmitting conductor, and in which connecting relays are provided whereby the common testing mechanism may be connected to the transmitting conductor of any one of the trunk groups.

The foregoing and other features of the invention will be discussed more fully in the following specification.

Figure 2:
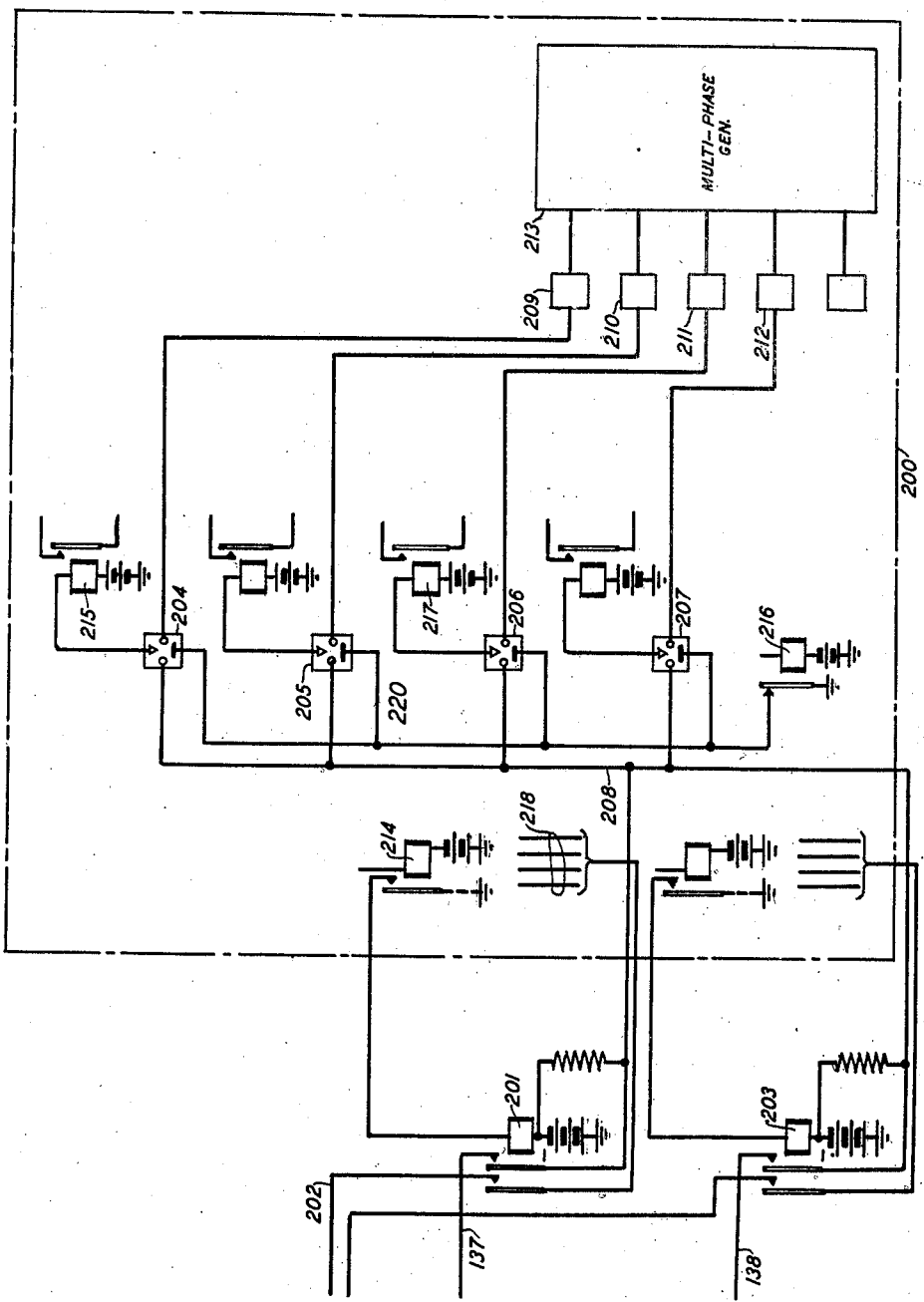

In the drawings accompanying the specification:

Fig. 1 illustrates a plurality of line or trunk groups together with a series of discharge tubes for testing these groups and for transmitting impulses to a common testing mechanism; and Fig. 2 illustrates a portion of the testing mechanism which is common to the line or trunk groups.

While the invention is applicable to the testing of lines, links or other electrical circuits it is particularly useful in the testing of trunk groups at the selective stages of automatic telephone systems. Although not so limited, it is also particularly applicable to systems in which the selection of trunk groups is under control of a common controlling mechanism, such as a central office sender or marker, the marker serving to test the desired trunk groups and also to control the operation of the switches for extending connections to the selected trunks in these groups.

The drawings illustrate the invention applied to a switching stage in an automatic telephone system in which a common mechanism or marker controls the selective switches and performs the necessary tests of the outgoing trunk groups. Only two groups of trunks 100 and 101 are illustrated although it will be understood that any desired number of groups may be included in the testing system. These trunk groups are shown outgoing from a switching stage 102 which comprises a plurality of automatic switches of any suitable type serving to extend the incoming circuits 103 and 104 of these trunk groups.

The condition of each trunk group is determined by a series of discharge tubes which perform a continuous test of the individual trunks in the group and cause the transmission of testing impulses to the common mechanism whenever it is necessary to know the condition of the individual trunks in the group. For example, the series of tubes 105 are provided for the trunk group 100, there being an individual tube in the series for each trunk in the group. Similarly, a series of tubes 125 are provided for the trunk group 101, and other groups of tubes would be provided for other trunk groups not shown. More specifically, the tubes 106, 107, 108 and 109 are individual respectively to the trunks 110, 111, 112 and 113. Each of these tubes, such as the tube 106, has a pair of control electrodes 114 and 115 for ionizing the tube and the usual anode and cathode elements 116 and 117. The control electrode 114 of the tube 106 is connected through resistance 118 to the sleeve conductor 119 of the trunk 110 and is connected through resistances 118 and 120 to the negative pole of battery 121. The other control electrode 115 is connected through a resistance 122 to the positive pole of battery 123. The voltage of the batteries 121 and 123 is such that the tube 106 is ionized when no busy ground potential is present on the sleeve conductor 119. Hence as long as the trunk 110 is idle the tube 106 remains ionized and ready for the transmission of signals. Similarly, the control electrodes of the remaining tubes 107, 108 and 109 are connected through resistances 144, 141 and 146, respectively, to the sleeve conductors of the trunks 111, 112, 113 and through additional resistances to the batteries 121 and 123. Thus the tubes connected to idle trunks in the group 100 are continuously ionized, whereas the tubes connected to busy trunks, which have the usual ground potential thereon, are in a deionized condition.

The signals, which are transmitted to the common marker or testing mechanism to identify the trunks of a group that are idle when the marker is ready to perform the test, are produced by a multiphase generator 126 and a plurality of impulse generating devices 127, 128, 129, 130, etc. The generator 126 is capable of producing alternating potentials of a plurality of phases. These potentials are applied to the impulse generators 127, 128, 129, 130, etc., and each generator produces an impulse per cycle, these impulses corresponding in phase to the phases of the potentials supplied from the generator 126. Since the impulse generating mechanism utilized in this system may be of any suitable type, it has been illustrated diagrammatically in the drawings. However, a better understanding of the details of such a mechanism may be had from the patents to W. H. T. Holden, Nos. 2,252,766 of August 19, 1941, 2,285,815 of June 9, 1942 and 2,324,394 of July 13, 1943.

The output circuits from the impulse generators 127, 128, 129, 130 are connected respectively to the anodes 116, 131, 132 and 133 of the tubes 106, 107, 108 and 109 and are also similarly connected to the anodes of the tubes of the group 125 and of all other groups. Thus the several tubes of the series 105 have impulses of different phases applied to their anode element so that the signals passed by these tubes are separated in time in accordance with the phases of the incoming impulses.

The cathode elements 117, 134, 135 and 136 of the tubes are connected to the single signaling conductor 137 which extends to the common marker or testing mechanism 200. All of the signal information pertaining to the condition of the entire group of trunks 100 is transmitted over this single conductor 137, thus eliminating the large number of testing conductors that have usually been necessary heretofore in testing systems of this kind. Likewise, the cathodes of the group 125 are connected to the single signaling conductor 138 which extends to the common marker 200.

The marker 200, which contains the testing mechanism, is connectable to the switches at the switching stage 102 and to the desired groups of trunks outgoing therefrom by means of suitable connecting devices, such as relay connectors. For example, the relay connector 201 serves to connect the marker 200 to the signaling conductor 137 for testing the trunks of the group 100 and also to connect the marker by way of conductor 202 to the switches having access to the trunks of group 100 for the purpose of operating the proper one of these switches to make connection with a selected idle trunk. In like manner the relay connector 203 serves to connect the marker 200 to the trunk group 101 and the switches having access thereto.

The testing mechanism in the marker 200 comprises a series of space discharge tubes 220 including the tubes 204, 205, 206 and 207. Each of these tubes has a pair of control electrodes, an anode and a cathode. The signal conductor 137 or 138 incoming from the group of trunks undergoing test is connected through the associated connector relay 201 or 203 to the common conductor 208, which is connected to one of the control electrodes in each of the testing tubes in the marker. The other control electrodes of these tubes are connected respectively to the pulse generators 209, 210, 211, 212, etc., and these generators are supplied with alternating current of different phases by means of the multiphase generator 213.

The multiphase source 213 and the impulse generators 209, 210, etc., are similar to the device 126 and the associated impulse generators already discussed. The output voltages of the devices 126 and 213 are of the same frequency and also of the same phases. The impulse generators 209, 210, 211, 212, etc., differ from the generators 127, 128, 129, 130 in that they produce impulses of the opposite polarity. For example, if the generator 127 produces a positive impulse of phase 0, generator 209 produces a negative impulse of phase 0. Similarly, if generators 128, 129 and 130 produce positive impulses of phases 1, 2 and 3, respectively, the corresponding generators 210, 211 and 212 produce negative impulses of phases 1, 2 and 3. Therefore, when a positive impulse of phase 0 is transmitted over conductor 137 to the control electrodes of tubes 204, 205, 206 and 207, the tube 204 alone will ionize since a negative impulse of the same phase is applied to its other control electrode. None of the other tubes will ionize since the positive and negative impulses applied to its control electrodes are not in phase with each other.

Assume now that it is desired to make a test of the trunk group 100 to determine which trunks are idle in order that a connection may be extended over the incoming circuits 103 to some one of the idle trunks in this group. Assume also that at the time the test is made trunks 110 and 112 are idle and that trunks 111 and 113 are busy. Since trunk 110 is idle no ground potential is present on the test conductor 119, and the full negative potential of battery 121 appears on the control electrode 114 of tube 106 over a circuit including resistances 120 and 118 and conductor 139. At the same time the full positive potential of battery 123 appears on control electrode 115 through the resistance 122, and the resultant voltage across these control electrodes is sufficient to ionize the tube. In like manner the potential of battery 121 is applied through resistances 140 and 141 and conductor 142 to the control electrode of tube 108 and the potential of battery 123 is applied through resistance 143 to the other control electrode, resulting in the ionization of the tube 108. Since, however, the trunk 111 is busy the ground potential on the sleeve conductor thereof is applied by way of resistance 144 and conductor 145 to the control electrode of tube 107. Hence the voltage applied across the control electrodes of this tube is insufficient to ionize it. Likewise, the ground potential on the sleeve of the busy trunk 113 is applied over resistance 146 and conductor 147 to the control electrode of tube 109, and this tube remains deionized.

As soon as the marker 200 is prepared to make the test of the trunk group 100 a relay 214 in the marker causes the operation of the connector relay 201 to establish connection with the trunk group. The signal conductor 137 is now extended to the testing tubes in the marker, and signal impulses of the phases characterizing the idle trunks in the group are transmitted over this conductor to the tubes 220. For instance, each time the generator 127 produces a positive impulse of phase 0, a signal impulse is transmitted over conductor 148 across the main discharge gap of the ionized tube 106, including anode 116 and cathode 117, signal conductor 137, contacts of connector relay 201, conductor 208 to the control electrodes of all tubes in the group 220. Since these signal impulses are in phase with the negative impulses applied to the tube 204 by the generator 209 the tube 204 ionizes and completes an operating circuit from battery through the winding of relay 215, across the main discharge gap of tube 204 to ground at the back contact of control relay 216. Relay 215 operates to record the fact that trunk 110, which is characterized by impulses of phase 0, is idle at this moment. In like manner, each time the generator 129 produces an impulse of phase No. 2, a signal is transmitted over conductor 149 through the discharge tube 108, conductor 137, connector relay 201 to the control electrodes of tubes 201. These impulses, being in phase with the impulses produced by generator 211, cause the ionization of tube 206 and the resultant operation of relay 217 to record the fact that trunk 112 is also idle. Similarly, impulses of proper phases representing other idle trunks in the group may be transmitted over the conductor 137 to cause the operation of the corresponding tubes in the group 220. However, no impulses are transmitted in those phase positions which correspond to busy trunks in the group 100, such as trunks 111 and 113, because the tubes in the group 105 corresponding to these busy trunks are deionized.

Following the operation of the relays 215, 217 and such other relays as may represent idle trunks in the group 100, the marker 200 determines which one of these trunks shall be used and closes an operating circuit over the proper one of the conductors 218 through the connector relay 201 to the corresponding one of the conductors 150 and thence to the switches at the switching stage 102. If switches of the cross-bar type are utilized, the circuit over the conductor 150 may serve to operate the switch magnet to cause the closure of the switch contacts to seize the chosen trunk in the group.

After the trunk has been chosen and the switches are operated, the connector relay 201 releases the marker from the trunk group, and the testing circuits are restored to their normal condition. The operated tubes in the group 220 may be released by the operation of the control relay 216.

If it is assumed that the trunk 110 is the one chosen for use, a ground potential is applied to conductor 119 of this trunk, and the tube 106 is extinguished so that the trunk will appear busy when the testing mechanism attempts to establish another connection over this trunk group.

The marker and testing mechanism 200 is now free to make subsequent tests either in the group 100 by reconnecting itself thereto through the operation of relay 201, or tests in the group 101 by connecting itself thereto through the contacts of connector relay 203, or tests in any other trunk group that may be similarly provided in the system.

For a more complete understanding of an automatic telephone system in which the common controlling markers, sender and testing mechanisms are provided, reference is made to the patent to W. W. Carpenter, No. 2,235,803 of March 18, 1941.

What is claimed is:

1. In combination, a group of lines, a testing mechanism for determining the busy or idle condition of said lines, a signal conductor interconnecting said group of lines and said testing mechanism, means for producing in said conductor signals of a plurality of phases, said phases representing respectively the lines of said group, and means in said testing mechanism responsive to said signals for determining the condition of said lines.

2. In combination, a group of lines, means for selecting one of said lines for use including a testing mechanism for determining the busy or idle condition of said lines, said testing mechanism comprising a plurality of testing devices corresponding respectively to the lines of said group, a signal conductor, means for producing in said conductor signals of a plurality of different phases, said phases representing respectively the lines of said group, and means in said testing mechanism responsive to said signals for operating said testing devices to determine the condition of the lines of said group.

3. In combination, a group of lines, a testing mechanism for testing all of said lines to determine their busy or idle condition and for selecting an idle one thereof for use, a signal conductor, means for producing signal impulses of different phases, said phases representing respectively the lines of said group, means for causing the transmission over said conductor of signal impulses of the phases representing all lines of said group in a given condition, and means in said testing mechanism responsive to said signal impulses for indicating the condition of said lines.

4. In combination, a group of equivalent lines, testing mechanism for selecting an idle one of said lines for use comprising a plurality of test relays, said relays corresponding respectively to the lines of said group, impulse generating devices associated respectively with said lines for producing impulses of different phases, each of said phases characterizing the associated line, a signal conductor extending to said testing mechanism, means for causing the transmission over said conductor of the signal impulses representing all lines of said group in an idle condition, and means in said testing mechanism responsive to said signal impulses for causing said relays to operate to indicate the condition of said lines.

5. In combination, a group of equivalent lines, means for testing all of said lines to determine the busy or idle condition thereof and to select an idle one for use, said means comprising a plurality of test relays, one for each of said lines, a single conductor extending from said group of lines to said test relays, means for producing a succession of impulses of different phases, said phases representing respectively the lines of said group, means for causing the transmission over said conductor of impulses of the phases representing all lines of said group in a given condition, and means responsive to the impulses tranmitted over said conductor for operating said test relays to indicate the condition of said lines.

6. In combination, a plurality of groups of lines, a testing mechanism common to said groups, a single transmitting conductor for each group of lines, means for connecting the transmitting conductor of any group to said testing mechanism, means for transmitting over said conductor to the testing mechanism impulses of different phases, said phases representing respectively the lines of the associated group, and means in said testing mechanism responsive to said impulses for indicating the idle lines in said group.

7. In combination, a group of trunks, a testing mechanism for making a simultaneous test of the trunks of said group comprising a series of test tubes, said tubes corresponding respectively to the trunks of said group, a single transmitting conductor extending from said trunk group to said testing mechanism, means for producing impulses of different phases, said phases corresponding respectively to the trunks of said group, means for transmitting over said conductor impulses of the phases representing idle trunks and for applying said impulses to said tubes, and means responsive to the operation of said tubes for indicating the idle trunks of said group.

8. In combination, a group of lines, said lines being characterized as busy by the presence of an electrical condition thereon, a plurality of discharge devices, one for each of said lines, means for producing a succession of impulses of different phases, said phases representing respectively the lines of said group, circuit means for applying said impulses in succession to said discharge devices, and means dependent upon the condition of any one of said lines for causing the corresponding discharge device to operate in response to the application thereto of an impulse of corresponding phase.

9. In combination, a plurality of groups of lines, the busy and idle condition of said lines being characterized by different electrical conditions, a series of discharge tubes common to said groups for testing the lines thereof, the tubes of the series corresponding respectively to the lines of each group, means for connecting said tubes to the lines of any desired group, means for producing a succession of impulses of different phases, said phases representing respectively the lines of the group to be tested, means for applying the impulses of different phases to the corresponding tubes of the series, and means dependent upon the condition of the lines of the group for causing the operation of all tubes corresponding to idle lines in response to the application of impulses of corresponding phases.

10. In combination, a plurality of groups of lines, each group of lines having an individual series of space discharge tubes, one for each line in the group, circuit means for connecting each line to an electrode of the corresponding tube, means for ionizing the tubes corresponding to all idle lines, busy lines being characterized by an electrical condition which prevents the ionization of the corresponding tubes, a testing mechanism common to said groups of lines, means for connecting said common testing mechanism to a desired one of said groups, said testing mechanism including a series of discharge tubes, one for each line in the connected group, a single transmitting conductor interconnecting the discharge tubes of the connected group and the tubes of said common testing mechanism, a first means for generating a succession of impulses of different phases, said phases representing respectively the lines of the connected group, means for applying said impulses to the successive tubes of the series individual to the group of lines connected to the common testing mechanism to send over said single transmitting conductor to the tubes of said common mechanism impulses of the phases representing the idle lines of said group, a second means for generating impulses of said phases and for applying them to the successive tubes of the common testing mechanism, and means for operating each tube of said testing mechanism to which impulses of the same phase are applied by said first and second impulse generating means to indicate the idle lines in the connected group.

WILLIAM H. T. HOLDEN.